US010062302B2

(12) United States Patent
Chen

(10) Patent No.: US 10,062,302 B2
(45) Date of Patent: Aug. 28, 2018

(54) VISION-ASSIST SYSTEMS FOR ORIENTATION AND MOBILITY TRAINING

(71) Applicant: Toyota Motor Engineering & Manufacturing North America, Inc., Erlanger, KY (US)

(72) Inventor: Tiffany Chen, San Jose, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 253 days.

(21) Appl. No.: 15/059,413

(22) Filed: Mar. 3, 2016

(65) Prior Publication Data
US 2017/0256181 A1 Sep. 7, 2017

(51) Int. Cl.
*G09B 21/00* (2006.01)
(52) U.S. Cl.
CPC .................................. *G09B 21/003* (2013.01)
(58) Field of Classification Search
CPC .................... A61B 1/00163; A61B 5/150801
See application file for complete search history.

(56) References Cited

U.S. PATENT DOCUMENTS

| 5,803,740 A | 9/1998 | Gesink et al. |
| 7,861,676 B2 | 1/2011 | Kates |
| 8,358,215 B2 | 1/2013 | Asad et al. |
| 2006/0143022 A1 | 6/2006 | Bird et al. |
| 2010/0145729 A1 | 6/2010 | Katz |
| 2011/0046519 A1* | 2/2011 | Raheman ............... A61B 5/112 600/595 |
| 2015/0196101 A1 | 7/2015 | Dayal et al. |

\* cited by examiner

*Primary Examiner* — James S McClellan
(74) *Attorney, Agent, or Firm* — Dinsmore & Shohl LLP

(57) ABSTRACT

Vision-assist systems and methods include use of processor(s) and a communicatively coupled feedback device and environmental sensing device upon which generated feedback is based. Machine readable instructions stored on a memory module cause the system to perform the following when executed by the processor(s): record a first metric corresponding to a level of reliance by a user on the feedback device at a first time; record a second metric corresponding to the level of reliance by the user on the feedback device at a second time after the first time; and record an awarded amount of reliance points when the second metric is less than the first metric, indicative of a decrease on a reliance by the user on the vision-assist system. The awarded amount of reliance points corresponds to a percentage by which the second metric decreases compared to the first metric.

16 Claims, 4 Drawing Sheets

VISION-ASSIST SYSTEMS FOR ORIENTATION AND MOBILITY TRAINING

TECHNICAL FIELD

The present specification generally relates to vision-assist systems and, more specifically, to vision-assist systems for orientation and mobility training of visually impaired individuals.

BACKGROUND

Newly visually impaired individuals may undergo an orientation & mobility ("O&M") training to learn how to cope with vision loss while developing skills such as using a white cane and navigating their surroundings. Long-time visually impaired individuals may also undergo such O&M training to further develop and/or refine such skills. Such individuals may utilize a vision-assist system and may grow too dependent on the vision-assist system over time. As a result, the individuals may not build sufficient confidence in their own skills and abilities.

Accordingly, a need exists for vision-assist systems that assist a visually impaired user with O&M training while encouraging the visually-impaired user to gain confidence in his or her own abilities.

SUMMARY

In one embodiment, a vision-assist system includes one or more processors, a memory module communicatively coupled to the one or more processors, an environmental sensing device communicatively coupled to the one or more processors and operable to generate information regarding an environment, a feedback device communicatively coupled to the one or more processors and operable to generate feedback at least partially based on the generated environmental information of the environmental sensing device, and machine readable instructions stored in the memory module. The machine readable instructions cause the vision-assist system to perform at least the following when executed by the one or more processors: record a first metric corresponding to a level of reliance by a user on the feedback device at a first time; record a second metric corresponding to the level of reliance by the user on the feedback device at a second time, wherein the second time occurs after the first time; and record an awarded amount of reliance points when the second metric is less than the first metric, indicative of a decrease on a reliance by the user on the vision-assist system. The awarded amount of reliance points corresponds to a percentage by which the second metric decreases compared to the first metric.

In another embodiment, a method for awarding points based on reliance on a vision-assist system includes recording a first metric corresponding to a level of reliance on a feedback device by a user on the vision-assist system at a first time; recording a second metric corresponding to the level of reliance on the feedback device by the user on the vision-assist system at a second time, wherein the second time occurs after the first time; and awarding an amount of reliance points when the second metric is less than the first metric, indicative of a decrease on a reliance by the user on the vision-assist system. An environmental sensing device comprising at least one of an environment camera and one or more microphones is communicatively coupled to the one or more processors and is operable to generate information regarding an environment. The feedback device is communicatively coupled to one or more processors of the vision-assist system and is operable to generate feedback at least partially based on the generated environmental information of the environmental sensing device. The amount of reliance points corresponds to a percentage by which the second metric decreases compared to the first metric. The method further includes storing in a cloud database system communicatively coupled to the one or more processors at least one of the amount of reliance points and one or more other user training progression tracking metrics based on user interaction with the vision-assist system.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include vision-assist systems including a feedback device, a memory module, and a processor to record metrics based on at least a user's level of reliance on the feedback device over time. The vision-assist systems may thus provide incentives for visually impaired users undergoing O&M training with the vision-assist systems to learn to rely less on the systems during the training while developing a greater confidence in their own abilities. An example vision-assist system may further include an environmental sensing device such as an environment camera and/or speakers communicatively coupled to the feedback device. The level of reliance may be at least partially based on reliance on a navigation feature utilizing data from a global positioning system (GPS) sensor communicatively coupled to the processor, reliance on a Braille assist feature associated with the environmental sensing device and the memory module, and/or reliance on an object identification and/or on a facial recognition assist feature, each associated with the environmental sensing device and the memory module.

The vision-assist system may store the recorded metrics, which are based on the amount or level of reliance by a user on the feedback device. The recorded metrics may be stored on a cloud database system, which is communicatively coupled to the processor, along with one or more other user training progression tracking metrics that are based on user interaction with the vision-assist system. The user and/or one or more training instructors may, for example, access the cloud database system to track the user's O&M training progress and compare the user's progress against other O&M training participants. Furthermore, the vision-assist systems described herein may improve and allow environmental and social interactions that are currently difficult or not possible for blind and visually impaired individuals while encouraging the visually-impaired user to gain confidence in his or her own abilities. Various vision-assist systems will be described in more detail herein with specific reference to the corresponding drawings.

Figure 1:
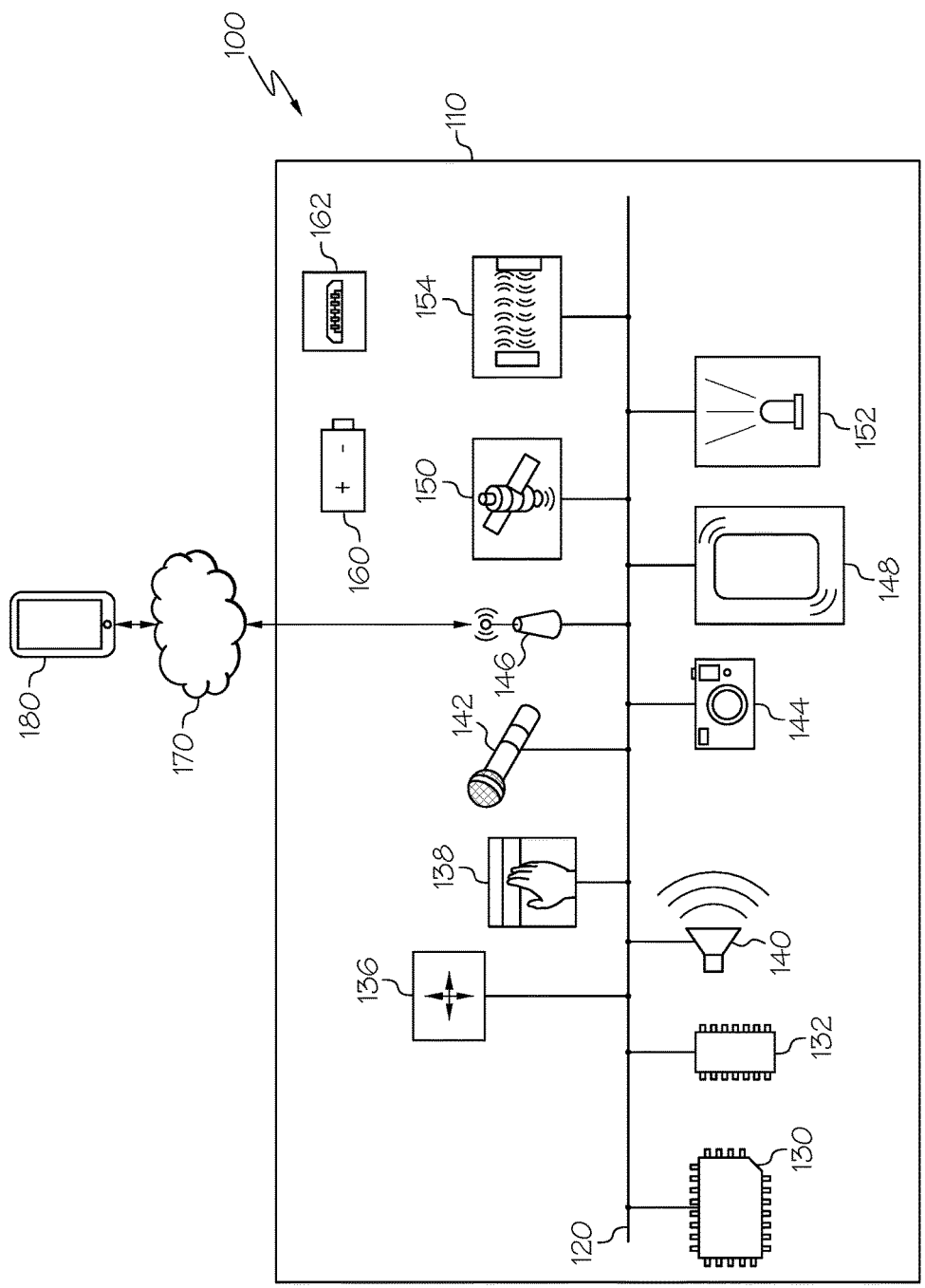
FIG. 1 schematically depicts a vision-assist system including a variety of sensors and electronic components, according to one or more embodiments shown and described herein.

Referring now to FIG. 1, one embodiment of a vision-assist system 100 is schematically depicted. The example vision-assist system 100 includes one or more devices 110 (that may include wearable components that a user wears such as a vest, necklaces, glasses, and/or the like, for example) including and/or communicatively coupled to a communication path 120, one or more processors 130, one or more memory modules 132, one or more inertial measurement units 136, tactile input hardware 138, one or more speakers 140, one or more microphones 142, one or more environment cameras 144, network interface hardware 146, one or more tactile feedback devices 148, one or more location sensors 150, one or more lights 152, one or more proximity sensors 154, one or more batteries 160, and one or more charging ports 162. The various components of the vision-assist system 100 and the interaction thereof will be described in detail below.

Still referring to FIG. 1, the communication path 120 may be formed from any medium that is capable of transmitting a signal such as, for example, conductive wires, conductive traces, optical waveguides, or the like. Moreover, the communication path 120 may be formed from a combination of mediums capable of transmitting signals. In one embodiment, the communication path 120 comprises a combination of conductive traces, conductive wires, connectors, and buses that cooperate to permit the transmission of electrical data signals to components such as processors, memories, sensors, input devices, output devices, and communication devices. Accordingly, the communication path 120 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 120 communicatively couples the various components of the vision-assist system 100. As used herein, the term "communicatively coupled" means that coupled components are capable of exchanging data signals with one another such as, for example, electrical signals via conductive medium, electromagnetic signals via air, optical signals via optical waveguides, and the like.

Each of the one or more processors 130 of the vision-assist system 100 may be any device capable of executing machine readable instructions. Accordingly, each of the one or more processors 130 may be a controller, an integrated circuit, a microchip, a computer, or any other computing device. Each of the one or more processors 130 is communicatively coupled to the other components of the vision-assist system 100 by the communication path 120. Accordingly, the communication path 120 may communicatively couple any number of processors with one another, and allow the components coupled to the communication path 120 to operate in a distributed computing environment. Specifically, each of the components may operate as a node that may send and/or receive data.

Each of the one or more memory modules 132 of the vision-assist system 100 is coupled to the communication path 120 and communicatively coupled to the one or more processors 130. Each of the one or more memory modules 132 may comprise RAM, ROM, flash memories, hard drives, or any device capable of storing machine readable instructions such that the machine readable instructions can be accessed and executed by the one or more processors 130. The machine readable instructions may comprise logic or algorithm(s) written in any programming language of any generation (e.g., 1GL, 2GL, 3GL, 4GL, or 5GL) such as, for example, machine language that may be directly executed by the one or more processors 130, or assembly language, object-oriented programming (OOP), scripting languages, microcode, etc., that may be compiled or assembled into machine readable instructions and stored in the one or more memory modules 132. Alternatively, the machine readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

Each of the one or more inertial measurement units 136 is coupled to the communication path 120 and communicatively coupled to the one or more processors 130. Each of the one or more inertial measurement units 136 may include one or more accelerometers and one or more gyroscopes. Each of the one or more inertial measurement units 136 transforms sensed physical movement of the vision-assist system 100 into a signal indicative of an orientation, a rotation, a velocity, or an acceleration of the vision-assist system 100. Some embodiments of the vision-assist system 100 may not include the one or more inertial measurement units 136, such as embodiments that include an accelerometer but not a gyroscope, embodiments that include a gyroscope but not an accelerometer, or embodiments that include neither an accelerometer nor a gyroscope. Some embodiments may not include the one or more inertial measurement units 136.

Still referring to FIG. 1, the tactile input hardware 138 is coupled to the communication path 120 and communicatively coupled to the one or more processors 130. The tactile input hardware 138 may be any device capable of transforming mechanical pressure (e.g., the pressure from a user contacting the tactile input hardware 138) into a data signal that can be transmitted over the communication path 120 such as, for example, a button, a switch, a knob, a microphone or the like. In some embodiments, the tactile input hardware 138 includes a power button, a volume button, an activation button, a scroll button, or the like. In some embodiments, the tactile input hardware 138 includes a pressure sensor, a touch strip, a pressure strip, or the like. Some embodiments may not include the tactile input hardware 138.

Each of the one or more speakers 140 is coupled to the communication path 120 and communicatively coupled to the one or more processors 130. Each of the one or more speakers 140 transforms data signals from the vision-assist system 100 into audible mechanical vibrations. However, it should be understood that in other embodiments the vision-assist system 100 may not include the one or more speakers 140.

Each of the one or more microphones 142 is coupled to the communication path 120 and communicatively coupled to the one or more processors 130. Each of the one or more microphones 142 may be any device capable of transforming a mechanical vibration associated with sound into an electrical signal indicative of the sound. Some embodiments may not include the one or more microphones 142.

Each of the one or more environment cameras 144 is coupled to the communication path 120 and communicatively coupled to the one or more processors 130. Each of the one or more environment cameras 144 may be any device having an array of sensing devices (e.g., pixels) capable of detecting radiation in an ultraviolet wavelength band, a visible light wavelength band, or an infrared wavelength band. Each of the one or more environment cameras 144 may have any resolution. The one or more environment cameras 144 may include an omni-directional camera, or a panoramic camera. In some embodiments, one or more optical components, such as a mirror, fish-eye lens, or any other type of lens may be optically coupled to at least one of the one or more environment cameras 144.

The network interface hardware 146 is coupled to the communication path 120 and communicatively coupled to the one or more processors 130. The network interface hardware 146 may be any device capable of transmitting and/or receiving data via a network 170. Accordingly, the network interface hardware 146 can include a communication transceiver for sending and/or receiving any wired or wireless communication. For example, the network interface hardware 146 may include an antenna, a modem, LAN port, Wi-Fi card, WiMax card, mobile communications hardware, near-field communication hardware, satellite communication hardware and/or any wired or wireless hardware for communicating with other networks and/or devices. In some embodiments, the network interface hardware 146 includes hardware configured to operate in accordance with the Bluetooth wireless communication protocol. In other embodiments, the network interface hardware 146 includes hardware configured to operate in accordance with a wireless communication protocol other than Bluetooth.

Still referring to FIG. 1, in some embodiments, the vision-assist system 100 may be communicatively coupled to a remote electronic device 180 via the network 170. In some embodiments, the network 170 is a personal area network that utilizes Bluetooth technology to communicatively couple the vision-assist system 100 and the remote electronic device 180. In other embodiments, the network 170 may include one or more computer networks (e.g., a personal area network, a local area network, or a wide area network), cellular networks, cloud database systems, satellite networks and/or a global positioning system and combinations thereof. Accordingly, the vision-assist system 100 can be communicatively coupled to the network 170 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 170 may be utilized to communicatively couple the vision-assist system 100 with the remote electronic device 180. The remote electronic device 180 may include a mobile phone, a smartphone, a personal digital assistant, a camera, smart eyewear, a dedicated mobile media player, a mobile personal computer, a laptop computer, and/or any other remote electronic device capable of being communicatively coupled with the vision-assist system 100. The remote electronic device 180 may include one or more processors and one or more memories. The one or more processors can execute logic to communicate with the vision-assist system 100. The remote electronic device 180 may be configured with wired and/or wireless communication functionality for communicating with the vision-assist system 100. In some embodiments, the remote electronic device 180 may perform one or more elements of the functionality described herein, such as in embodiments in which the functionality described herein is distributed between the vision-assist system 100 and the remote electronic device 180. In some embodiments, the remote electronic device 180 may provide a user interface through which one or more settings or configurations of the vision-assist system 100 may be altered (e.g., the ability to turn feedback on or off, adjusting the frequency of feedback, adjusting the type of feedback, etc.). In some embodiments, the vision-assist system 100 is not communicatively coupled to a remote electronic device 180.

Still referring to FIG. 1, each of the one or more tactile feedback devices 148 is coupled to the communication path 120 and communicatively coupled to the one or more processors 130. Each of the one or more tactile feedback devices 148 may be any device capable of providing tactile feedback to a user. The one or more tactile feedback devices 148 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). Some embodiments may not include the one or more tactile feedback devices 148.

Each of the one or more location sensors 150 is coupled to the communication path 120 and communicatively coupled to the one or more processors 130. Each of the one or more location sensors 150 may be any device capable of generating an output indicative of a location. In some embodiments, the one or more location sensors 150 include a global positioning system (GPS) sensor, though embodiments are not limited thereto. Some embodiments may not include the one or more location sensors 150, such as embodiments in which the vision-assist system 100 does not determine a location of the vision-assist system 100 or embodiments in which the location is determined in other ways (e.g., based on information received from the one or more environment cameras 144, the one or more microphones 142, the network interface hardware 146, the one or more proximity sensors 154, the one or more inertial measurement units 136 or the like).

Each of the one or more lights 152 is coupled to the communication path 120 and communicatively coupled to the one or more processors 130. Each of the one or more lights 152 may be any device capable of outputting light, such as but not limited to a light emitting diode, an incandescent light, a fluorescent light, or the like. In some embodiments, the one or more lights 152 include a power indicator light that is illuminated when the vision-assist system 100 is powered on. In some embodiments, the one or more lights 152 includes an activity indicator light that is illuminated when the vision-assist system 100 is active or processing data. In some embodiments, the one or more lights 152 includes an illumination light for illuminating a field proximate the vision-assist system 100 (e.g. for illuminating an area in the field of view of a user of the vision-assist system 100). Some embodiments may not include the one or more lights 152.

Each of the one or more proximity sensors 154 is coupled to the communication path 120 and communicatively coupled to the one or more processors 130. Each of the one or more proximity sensors 154 may be any device capable of outputting a proximity signal indicative of a proximity of the vision-assist system 100 to an object in the path of the user (such as an individual speaking with a visually-impaired user of the vision-assist system 100). In some embodiments, the one or more proximity sensors 154 may include a laser scanner, a capacitive displacement sensor, a Doppler effect sensor, an eddy-current sensor, an ultrasonic sensor, a magnetic sensor, an optical sensor, a radar sensor, a sonar sensor, or the like. Some embodiments may not include the one or more proximity sensors 154, such as embodiments in which the proximity of the vision-assist system 100 to an object in the path of the user of the vision-assist system 100 is determined from inputs provided by other sensors (e.g., the one or more environment cameras 144, the one or more speakers 140, etc.) or embodiments that do not determine a proximity of the vision-assist system 100 to an object in the path of the user of the vision-assist system 100.

The vision-assist system 100 is powered by the one or more batteries 160, each of which is electrically coupled to the various electrical components of the vision-assist system 100. Each of the one or more batteries 160 may be any device capable of storing electric energy for later use by the vision-assist system 100. In some embodiments, the one or more batteries 160 may include a rechargeable battery, such as a lithium-ion battery or a nickel-cadmium battery. In embodiments in which the one or more batteries 160 include a rechargeable battery, the vision-assist system 100 may include the one or more charging ports 162, each of which may be used to charge the one or more batteries 160. Some embodiments may not include the one or more batteries 160, such as embodiments in which the vision-assist system 100 is powered by solar energy or energy harvested from the environment. Some embodiments may not include the one or more charging ports 162, such as embodiments in which the vision-assist system 100 utilizes disposable batteries for power.

It should be understood that the components of the vision-assist system 100 (including, but not limited to the one or more processors 130, the one or more memory modules 132, the one or more inertial measurement units 136, the tactile input hardware 138, the one or more speakers 140, the one or more microphones 142, the one or more environment cameras 144, the network interface hardware 146, the one or more tactile feedback devices 148, the one or more location sensors 150, the one or more lights 152, the one or more proximity sensors 154, the one or more batteries 160, and the one or more charging ports 162) may be distributed among a variety of physical modules, each of which are communicatively coupled via a wireless network or a wired network. For example, in some embodiments described below, the components of the vision-assist system 100 may be distributed among an eyeglass module, a necklace, and/or an earpiece module, each of which may be wirelessly communicatively coupled or communicatively coupled via one or more wires. Furthermore, while the vision-assist system 100 depicted in FIG. 1 includes the one or more tactile feedback devices 148 and the one or more speakers 140 as possible feedback devices communicatively coupled to the one or more processors 130, embodiments are not limited thereto. In other embodiments, a feedback device other than the one or more tactile feedback devices 148 or the one or more speakers 140 may provide feedback to a user of the vision-assist system 100, such as in embodiments that provide feedback with a display module, or any other device capable of providing feedback to the user.

As an example and not a limitation, and with respect to embodiments including an earpiece module, the earpiece module may be wirelessly communicatively coupled to the vision-assist system 100 and may be configured to be worn around the ear of a user, for example. The speaker 140 may be configured to be inserted into the user's ear to produce audible messages for the user as described herein. The microphone 142 may serve as a user input device for inputting information (e.g., voice controls) into the vision-assist system 100. In some embodiments, the microphone 142 may receive a mechanical vibration associated with sound from an individual speaking with the user into an electrical signal to, for example, recognize the identity of the speaking individual.

Figure 2:
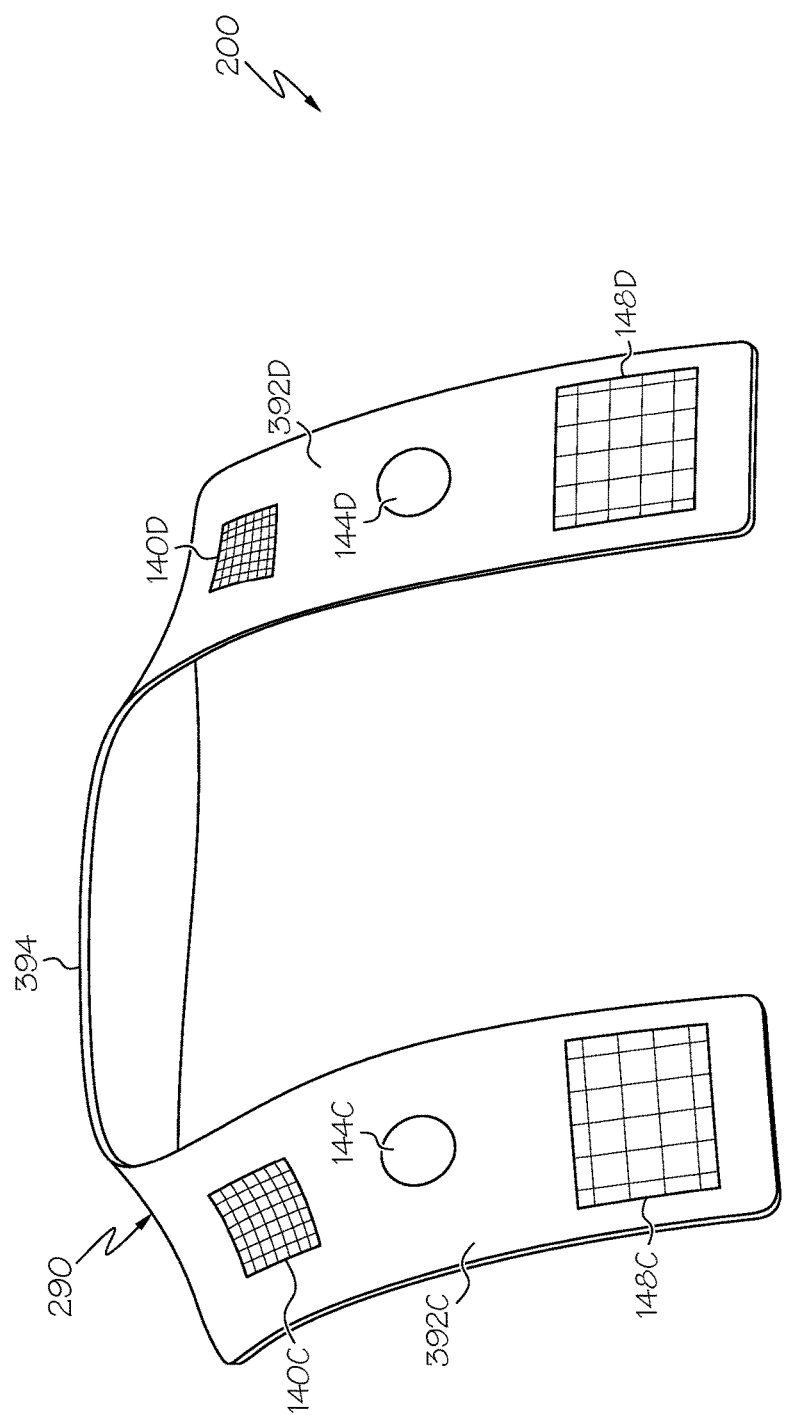
FIG. 2 schematically depicts a perspective view of a vision-assist system including a necklace module, according to one or more embodiments shown and described herein.
Figure 3:
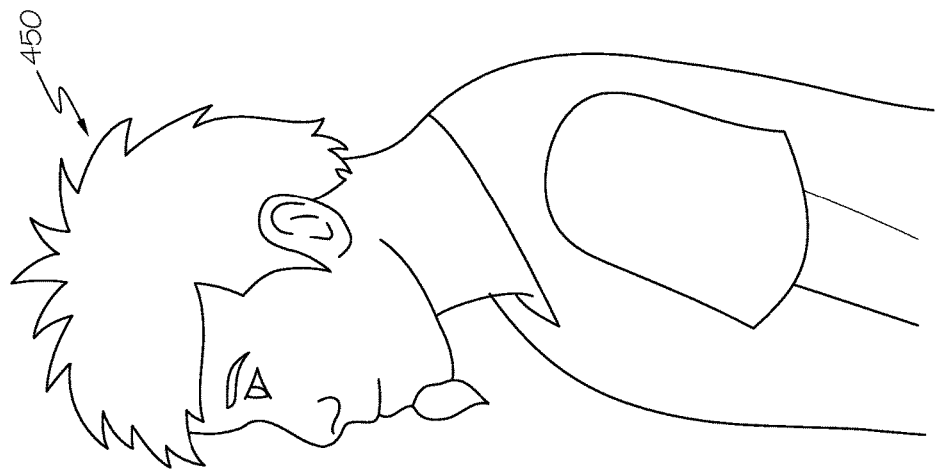
FIG. 3 schematically depicts a perspective view of a user utilizing the vision-assist system in the presence of another individual, according to one or more embodiments shown and described herein.
Figure 3:
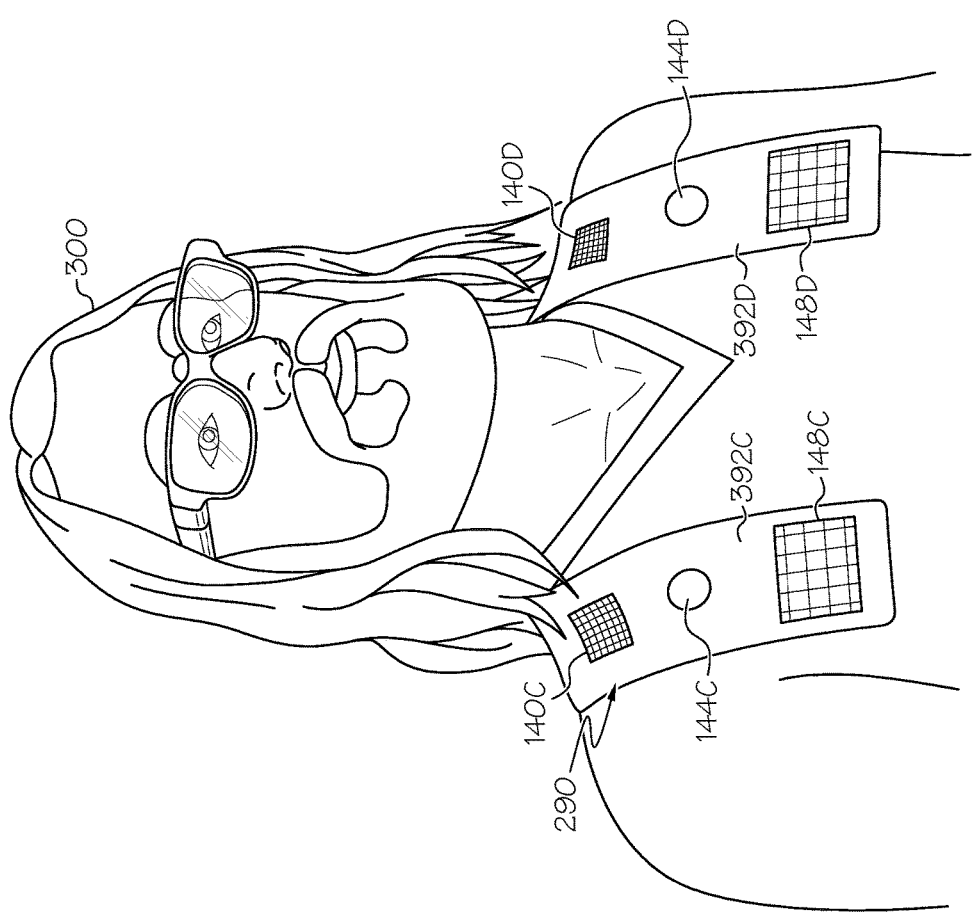

Referring now to FIG. 2, a perspective view of an example vision-assist system 200 is schematically depicted. The vision-assist system 200 includes a necklace module 290. The necklace module 290 has a necklace configuration intended to be worn around the neck of the user. The necklace module 290 includes a neck portion 394, a first chest portion 392C, and a second chest portion 392D. It should be understood that the necklace module 290 may be configured differently than what is illustrated in FIG. 3, and that the necklace module 290 may take on different shapes and sizes in other embodiments. Furthermore, while the vision-assist system 200 depicted in FIG. 2 includes the necklace module 290, embodiments are not limited thereto and vision-assist systems may include other wearable devices such as, for example, smartphones connected to other necklace type mountings and/or smart eyewear.

Referring again to the necklace module 290 depicted in FIG. 2, the necklace module 290 includes a first environment camera 144C, a second environment camera 144D, a first speaker 140C, a second speaker 140D, a first tactile feedback device 148C, and a second tactile feedback device 148D, each of which may be wirelessly communicatively coupled to modules such as eyewear and/or ear pieces. The first environment camera 144C is mechanically coupled to the first chest portion 392C. The second environment camera 144D is mechanically coupled to the second chest portion 392D. The first environment camera 144C and the second environment camera 144D are included in the one or more environment cameras 144 described above with reference to FIG. 1. While the necklace module 290 depicted in FIG. 2 includes the first environment camera 144C and the second environment camera 144D, other embodiments may include only a single environment camera or multiple environment cameras.

Still referring to FIG. 2, the first speaker 140C is mechanically coupled to the first chest portion 392C. The second speaker 140D is mechanically coupled to the second chest portion 392D. The first speaker 140C and the second speaker 140D are included in the one or more speakers 140 described above with reference to FIG. 1. While the necklace module 290 depicted in FIG. 2 includes the first speaker 140C and the second speaker 140D, other embodiments may include only a single speaker.

Still referring to FIG. 2, the first tactile feedback device 148C is mechanically coupled to the first chest portion 392C. The second tactile feedback device 148D is mechanically coupled to the second chest portion 392D. The first tactile feedback device 148C and the second tactile feedback device 148D are included in the one or more tactile feedback devices 148 described above with reference to FIG. 1. While the necklace module 290 depicted in FIG. 2 includes the first tactile feedback device 148C and the second tactile feedback device 148D, other embodiments may include only a single tactile feedback device.

In embodiments, one or more environmental sensing devices may be configured as visual and/or audible devices to sense environmental surroundings and may include, for example, one or more environment cameras, one or more microphones, one or more proximity sensors, and/or one or more other environmental sensing sensors. Some embodiments of the necklace module 290 may not include a speaker, may not include an environmental sensing device such as an environment camera and/or may not include a tactile feedback device. For example, some embodiment that only provide feedback with a speaker may not include a tactile feedback device. Conversely, some embodiments that only provide feedback with a tactile feedback device may not include a speaker.

Figure 4:
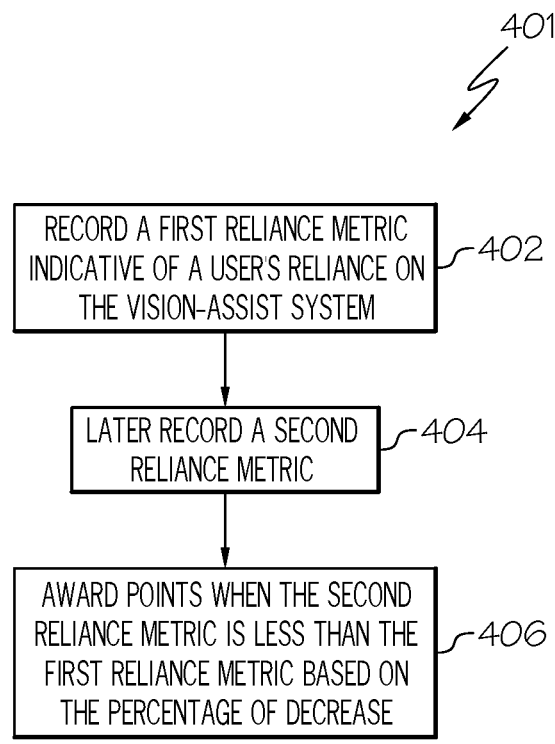
FIG. 4 schematically depicts a flowchart of a method of awarding points based on a reduction in reliance on a vision-assist system by a user, according to one or more embodiments shown and described herein.

Having described the hardware and components of various vision-assist systems, a method of providing feedback to a visually-impaired user using a vision-assist system and recording metrics based on an amount of user reliance on the feedback device will now be provided with reference to FIGS. 3-4. FIG. 3 illustrates a perspective view of a user 300 wearing the necklace module 290 in the presence of another individual 450. FIG. 4 illustrates a flowchart of a method of awarding points based on a reduction of reliance of the user 300 on the necklace module 290 of the vision-assist system 200 (FIG. 2), for example. As used herein, and with respect to a user of the visional-assist systems of the present disclosure, the term "reliance" means a user's dependence on the feedback device of the vision-assist system as a measurable unit. For example, a user that requests and/or is provided with twice the amount of feedback from the feedback device for a particular task than another user (or the same user at a different time) is relying on the device twice as much as another user (or the same user at a different time).

Further, the one or more devices 110 (FIG. 1) of the vision-assist system 100 (and other vision-assist system embodiments described in this disclosure) may include one or more processors 130 and a non-transitory computer-readable storage medium as the memory module 132 that is in communication with the processor(s) 130. The non-transitory computer-readable storage medium may include one or more programming instructions executable by the processor to cause the processor to enact steps such as those described above and herein with respect to FIG. 4, for example.

Referring now to FIG. 4, an example flowchart of a method 401 of awarding points based on a reduced user reliance on feedback provided to the user 300 (FIG. 3) is schematically depicted. At block 402, a first reliance metric indicative of a user's reliance on the vision-assist system is recorded. In particular, a first metric corresponding to a level of reliance by the user on the feedback device of the vision-assist system at a first time is recorded. At block 404, a second reliance metric indicative of the user's reliance on the vision-assist system is recorded at a later time. In particular, a second metric corresponding to the level of reliance by the user of the feedback device at a second time occurring after the first time is recorded. At block 406, when the second reliance metric is less than the first reliance metric, points are awarded based on the percentage of decrease between the first and second reliance metrics. For example, an awarded amount of reliance points are awarded to the user correspond to a percentage by which the second metric decreases compared to the first metric. Thus, when the second metric is less than the first metric, which is indicative of a decrease on a reliance by the user on the vision-assist system, the awarded amount of reliance points are recorded.

As described in greater detail in the sections below, the amount or level of reliance may be at least partially based on reliance on a navigation feature utilizing data from a GPS sensor communicatively coupled to the processor, reliance on a Braille assist feature associated with the environmental sensing device and the memory module, and/or reliance on an object identification and/or on a facial recognition assist feature, each associated with the environmental sensing device and the memory module. Further, in some embodiments, such as those described below, an environmental sensing device communicatively coupled to one or more processors of the vision-assist system is operable to generate information regarding the environment, and the level of reliance is at least partially based on features, as described herein, associated with the environmental sensing device and the memory module of the vision-assist system. As used herein, the term "environmental sensing device" means any device capable of sensing parameters of an environment. Non-limiting examples of an environmental sensing device include one or more environment cameras, one or more microphones, one or more proximity sensors, and/or one or more other environmental sensing sensors.

I. Navigation Feature

In some embodiments, the one or more location sensors 150 include a GPS sensor, and the level of reliance is at least partially based on a navigation feature utilizing data from the GPS sensor. The navigation feature may determine at least one or more navigational directions for a route that may be provided as feedback to the user via the feedback device, for example. The vision-assist system may determine the route based on the data from the GPS sensor.

An environmental sensing device, such as an environment camera, is communicatively coupled to one or more processors of the vision-assist system and is operable to generate information regarding the environment. The vision-assist system receives environmental image data from the environment camera, for example. The feedback device may provide feedback to the user of the one or more navigational directions at pre-determined points along the route based on the received environmental image data and the data from the GPS sensor.

For example, a visually-impaired user may wish to start learning to navigate a route to walk around his or her neighborhood. The user may be escorted around such a route by a sighted user the first time such that the vision-assist system records the route and/or the vision-assist system may initially determine the route based on entered route points. The vision-assist system may determine one or more routes from a starting point to one or more intermediate points to an ending point. The ending point may be the same as the starting point (e.g., the user starts and ends at home) or may be a different point. The one or more navigational directions may provide street names, landmarks, and/or turn indications (for example, walk 0.25 miles, turn right at Allen Street, walk 0.1 miles, turn left at Allen Street High School, etc.).

The feedback device may provide audible indications of these directions in real-time to the user (e.g., by one or more speakers). The instructions may be turn-by-turn instructions that also identify nearby points of interest. The vision-assist device may also drop and record points along the route for future reference and to provide feedback of such points to the user. Over time, the user can turn off the feedback device that provides instructions or tailor the amount of information provided (such as requesting only street names or points of interest but not turn-by-turn instructions) to allow the user to accelerate his or her familiarity with a certain route.

For example, the feedback is based on a user initiated request and/or automatically based on a feedback reduction algorithm. An amount of feedback provided by the feedback device may decrease over a period of use such that an amount of the one or more navigational directions provided to the user in an earlier use of the vision-assist system is greater than an amount of the one or more navigational directions provided to the user in a later use of the vision-assist system. As a non-limiting example, during a first initial use, the navigational directions may be provided via the feedback device to the user at every turn. Eventually, the feedback device may only partially provide tailored portions of the navigational directions to the user, such as only providing feedback at certain landmarks along the way and/or if the user deviates off-route. As the user repeats the route, the feedback device may start to decrease the amount of directions or hints provided to the user. The user may further be awarded points for a distance traveled that is associated with the path and a time for the user to reach the final destination. A faster time to navigate the path to reach the final destination (over a previous, slower time) may result in more points being awarded to the user.

The decrease in the amount of feedback provided by the feedback device is controllable via user input, for example. The user may select options to hear all of the navigational directions or tailor the directions, such as via request to only being provided with audible feedback at certain landmarks and/or at turns that occur after a certain distance (i.e., turns that occur after any distance over 0.5 miles such that directions regarding turns that occur under a preset distance are not provided to the user). Additionally or alternatively, the decrease in the amount of feedback provided is automatically controllable by a feedback reduction algorithm that reduces the amount of feedback over a period of time based on pre-determined tailored portions over one or more pre-determined time period intervals. For example, the feedback reduction algorithm may provide all of the navigational directions for the first week, and then reduce the amount of instructions provided week to week (e.g., the second week would provide instructions for every other street at which a turn is made, and the third week provides instructions only at turns occurring near landmarks).

II. Braille Assist Feature

In some embodiments, the level of reliance is at least partially based on a Braille assist feature associated with the environmental sensing device and the memory module of the vision-assist system. The environmental sensing device may include an environmental camera and/or one or more microphones to receive mechanical vibrations associated with a user's voice and transform the vibrations into an electrical signal indicative of the sound. The Braille assist feature may be equipped with the ability to identify Braille text via optical character recognition ("OCR") employable through image capture via the environmental camera, for example. The vision-assist system receives environmental image data from an environment camera, for example, and provides feedback with the feedback device of one or more definitions of Braille text viewable to the environmental sensing device and/or indications of user error when the user reads the Braille text. The Braille assist feature may also help a user identify letters or words and may assist to track the accuracy and progress of the user reading Braille via the one or more microphones, for example. The tracked progress may be provided for review by a therapist, instructor, or the user.

The feedback device may provide feedback of the one or more definitions of the Braille text viewable to the environmental sensing device upon user initiated request. For example, while reading Braille, the user may come across a word the user does not know and/or understand. The user would prompt the vision-assist system (such as through a prompt button and/or an audible command) to provide a definition for the word. The Braille assist feature may access a database (which may be, for example, a cloud database system) to retrieve a definition for the word, and the feedback device would audibly provide the definition to the user.

Additionally or alternatively, the feedback device provides feedback of indications of user error when the user reads the Braille text automatically and/or upon user initiated request. For example, the user may read Braille text out loud while the vision-assist system is able to view and interpret the Braille text via the environmental sensing device that may include the one or more microphones to capture the user's voice and the environment camera while monitoring the correctness of the user's reading in real-time. The user may request that the feedback device of the vision-assist system provide feedback of the monitored reading, such as when the user makes errors the types of errors made. The feedback may be made in real-time and/or after reading all or segmented portions of the Braille text (e.g., after reading an entire page or a paragraph). The feedback device may itself automatically provide feedback regarding the monitored reading, such as automatically informing the user in real-time when errors are made and/or providing corrective feedback to the user (i.e., audibly informing the user of the correct word). The feedback device may automatically provide a report at the end of the user's reading to summarize the amount and types of errors the user made during the reading.

Over time, a fewer amount of errors made by the user while reading may translate into a greater amount of training progression points provided to the user. As an example and not a limitation, an initial reading with 100 errors may result in 10 points given, while a subsequent reading with 90 errors may result in 20 points given (the original point value plus an amount relating to the reduction in errors). If more errors are made in the subsequent reading, however, the given point value may reflect the additional errors made and may subtract overall points from a total or may maintain a previous amount of points. As an example and not a limitation, an initial reading with 100 errors may result in 10 points given, while a subsequent reading with 110 errors may result in the same 10 points, 0 points, or a negative amount of points (such as −1 point per every additional set of ten errors made). It should be understood that other point system algorithms awarding the user for more points at periodic intervals in the training as the user proceeds to make fewer errors over time are within the scope of this disclosure.

III. Object Identification Assist Feature

In some embodiments, the level of reliance is at least partially based on an object identification assist feature associated with the environmental sensing device and the memory module of the vision-assist system. The object identification assist feature is configured (e.g., via one or more machine readable instructions) to assist the user in identifying an object.

A. Obstacle Identification and Assistance

In embodiments, the vision-assist system receives environmental image data from an environment camera, determines a location of an obstacle (e.g., which may be an object this is an obstruction in the path of the user) within a predetermined range based on the environmental image data, and provides feedback with the feedback device of based on the location of the obstacle. Further, the vision-assist system may be configured to detect when a cane utilized by the user contacts the obstacle and to provide feedback with the feedback device of such contact. The cane may be a white cane to symbolize to non-visually impaired individuals the presence of a visually-impaired user of the white cane. A white cane is generally referenced in examples herein; however, it should be understood that other cane colors are possible and within the scope of this disclosure. As a non-limiting example, a user may be trained to walk using a white cane that assists the user with identifying obstacles (and that notifies others that the user is visually-impaired). The white cane contacts obstacles to notify the user of the present of such obstacles. The user may use the white cane to identify such obstacles and trace along edges of buildings or sidewalks to follow the traced path while walking. The user may also use the white cane to identify different types of flooring.

The white cane may further contact the beginning of a staircase going upwards or downward, for example. The vision-assist system may be able to sense an object that is recognized via an image recognition algorithm as a staircase and may further sense the staircase location (and the direction and/or number of stairs) via the environmental sensing device that may include, for example, an environment camera and/or one or more proximity sensors. The vision-assist system may record the amount of time it takes for the user to contact the staircase with the white cane and/or suggest via the feedback device an alternative route around the staircase or other obstacle (e.g., a wheelchair ramp or other path may be available). The feedback device may warn the user of escalators that may be approaching and the direction of travel (upwards or downwards). Thus, the user may slowly learn to navigate with the white cane with the confidence that the vision-assist system is detecting obstacles that may occur and obstruct the user's path.

The vision-assist system may be configured to award one or more user training progression points based on an amount of time it takes for the user to contact the obstacle with the white cane and/or an amount of user initiated requests for feedback regarding the location of the obstacle. As a non-limiting example, the feedback device may automatically tell the user of approaching staircases (and associated directions) when the user first starts using the device and may reduce the amount of feedback provided to the user to warn the user of approaching staircases over time. The vision-assist system may further identify obstacles that are within a predetermined range, such as a staircase that is within 10 feet of the user, and may provide feedback to the user of the approaching obstacle, for example. The user may himself request feedback about any approaching obstacles within predetermined ranges that may be set by the user or automatically when beginning training. The user may adapt the system to only provide such feedback at period intervals that reduce over time. Or the user may prompt the vision-assist system for feedback about approaching specific and specified obstacles (whether they be staircases, major intersections/crosswalks, or buildings, for example).

B. Object Identification and Assistance

In other embodiments, the environmental sensing device includes an environment camera, and the vision-assist system receives environmental image data from the environment camera, and determines an identification of the object that is disposed within a within a predetermined range of the vision-assist system. The object does not necessarily need to be an obstacle obstructing the user's path. For example, the object may be a target point such as a park bench that the user is hoping to approach and sit upon. As a non-limiting example, a sensing range may be from about 5 feet to about 15 feet, and may be, for example, 10 feet of distance between the object and the user. The vision-assist system may be configured to determine the identification of the object based on the environmental image data by recognizing the object in the received environmental image data and within the sensing range using an object recognition algorithm. For example, the vision-assist system uses the object recognition algorithm to identify an object captured by environmental image data, and that may be within 10 feet of the system, as a park bench. The vision-assist system may be trained to recognize objects from an object recognition database of commonly-used objects and/or accessing a database stored in a cloud network system (e.g., a cloud database system). The vision-assist system may further be configured to provide feedback with the feedback device based on the determined identification of the object. The feedback device may, for example, audibly provide the user with guidance that an object identified as a recognized park bench is within 10 feet of the user.

In embodiments, the vision-assist system may be further configured to prompt the user to provide user input regarding a guessed identification of the object and to award one or more points when the guessed identification of the object matches a determined identification of the object. For example, a user may hold a box and be prompted to guess whether it is dishwasher detergent or a cereal box. As another example, the vision-assist system may assist to differentiate between different sets of user keys to help a user identify and recognize a certain person's set of keys. Points may be awarded for a correct guess that matches the actual determined identification of the object.

Further, the vision-assist system may be configured to identify objects based on user request, such as objects that the user may have misplaced or lost. For example, the user may have misplaced his or her keys, and the vision-assist system may identify an object as the misplaced keys and provide feedback to the user as to the location. The keys or another object may have fallen under a table, for example, and the feedback system may provide guidance to the user as the user uses his or her white cane to sweep the floor (as the user may be been trained to do so) to locate the keys or other object. The vision-assist system may be configured to analyze the user's sweeping pattern to identify areas that the user failed to search or failed to search effectively and to provide feedback regarding such failed search areas to the user. The vision-assist system may provide hints to the user about the object location, such that the user may find the object on his or her own, or may directly provide feedback to the user as to the object location. Such provided guidance may reduce the amount of time for the user to find the keys, or other object, which may otherwise have involved a more time-consuming search and potentially frustrating process for the user.

IV. Facial Recognition Assist Feature

In some embodiments, the level of reliance is at least partially based on a facial recognition assist feature to assist the user in facial recognition. The facial recognition assist feature may be associated with the environmental sensing device and the memory module of the vision-assist system.

Referring to FIG. 3, a user 400 may utilize a vision-assist system including the necklace module 290 (described above with reference to FIG. 2) in the presence of a person 450. As will be appreciated from the below description, the vision-assist system may help the user 300 with determining the identity of the person 450.

Any facial recognition algorithm or image processing algorithm may be used that is capable of recognizing the eyes of an individual speaking to the user and/or recognizing a moving mouth in a sequence of received image data. For example, in the scene depicted in FIG. 3, the vision-assist system recognizes a moving mouth of the person 450 and determines the identity of the person 450 based on the recognized moving mouth. In some embodiments in which the vision-assist system includes the one or more microphones 142, the one or more microphones 142 may receive a mechanical vibration associated with sound from an individual speaking with the user into an electrical signal, which may be used by the vision-assist system, along with the environment image data, to determine the identity of the individual. Additionally or alternatively, any facial recognition algorithm or image processing algorithm may be used that is capable of recognizing a face in received image data. For example, in the scene depicted in FIG. 3, the vision-assist system recognizes a face of the person 450 and determines the identity of the person 450 based on the recognized face.

In embodiments, the vision-assist system receives environmental image data from the environmental sensing device that includes an environment camera, determines an identity of a person based on the environmental image data by recognizing a face in the received environmental image data using a facial recognition algorithm, and provides feedback with the feedback device based on a determined identity of the person automatically and/or upon user initiated request. The faces may be recognized based on a comparison against faces stored in one or more databases. Additionally or alternatively, in embodiments, the vision-assist system receives environmental sound data from the environmental sensing device that includes one or more microphones, determines an identity of a person based on the environmental sound data by recognizing a voice via the one or more microphones using a voice recognition algorithm, and provides feedback with the feedback device based on a determined identity of the person automatically and/or upon user initiated request. For example, the environmental sensing device may include one or more microphones to capture the sound of an approaching individual's voice and transform it into an electrical signal indicative of the approaching individual's voice that may be compared against electrical signals indicative of voices associated with specific individuals that are stored in one or more databases.

In some embodiments that include the one or more speakers 140, the vision-assist system provides audible feedback to the user with the one or more speakers 140 based on the identity of the individual speaking to the user. Similarly, the vision-assist system may output audible commands to move in certain directions (e.g., towards the speaking individual) when following navigational prompts. In some embodiments that recognize a face in the received environment image data using a facial recognition algorithm, the vision-assist system provides feedback with the feedback device based on the recognized face. In some embodiments, the tactile feedback devices may be activated in different patterns or with different frequencies to indicate various commands (e.g., whether to move in specific directions when following navigational prompts). The vision-assist system may thus recognize the identity of a person approaching the user and alert the user that the approaching person is someone familiar to the user.

The vision-assist system may assist the user with learning how to identify others by aspects such as smell, sound, and the like. The user may be able to guess the identity of an approaching individual upon hearing the approaching individual's voice, the sound of their gait (e.g., walking pattern), the smell of a particular perfume or cologne the approaching individual may favor, a pressure and/or location of a supportive grip (such as on the user's arm) typically associated with the approaching (now approached) individual, and other such unique identifiers. For example, the vision-assist system may be configured to prompt the user to provide user input regarding a guessed identity of the person prior to providing feedback with the feedback device based on the determined identity of the person, and to award one or more points when the user's guessed identity of the person matches the determined identity of the person as a correct guess.

Alternatively or additionally, the vision-assist system may be configured to store the awarded amount of reliance points in a cloud database system communicatively coupled to the one or more processors. The vision-assist system may further be configured to provide one or more reports based on the awarded amount of reliance points and/or other user training progression tracking metrics, which metrics are based on user interaction with the vision-assist system. For example, the vision-assist system may be connected to the cloud database system to record the user's overall progress through training. The user may be awarded training points based on, for example, the user's speed of learning, the user's accuracy during learning, extent of reliance on the vision-assist device, and the like. After attaining a certain amount of points and/or successfully accomplishing one or more vision-assist system trackable tasks or challenges, the user may earn badges or trophies as incentives and rewards for a successful O&M training and for the user to develop more confidence in his or her own abilities during the training. Further, one or more training instructors may access the user's tracked training program via, for example, the cloud database system, to track the user's progress, assign homework to the user, and/or compare the user's progress to that of other users. Thus, the data collected in the cloud database system may allow instructors to access group-specific and/or user-specific reports that assist to determine and provide measurable levels of skills of a user and/or across users.

It should be understood that embodiments described herein are directed to vision-assist systems that record metrics based on a level of user reliance on a feedback device and that may provide incentives for newly visually impaired users undergoing O&M training to learn how to rely less on the systems over time while developing a greater confidence in their own abilities. The trackable level of user reliance may be at least partially based on reliance on a navigation feature utilizing data from a GPS sensor, reliance on a Braille assist feature, and/or reliance on an object identification and/or on a facial recognition assist feature. The vision-assist system may store recorded metrics that are based on the amount or level of user reliance on the feedback device, along with one or more other user training progression tracking metrics, on a cloud database system. Individuals may access the stored metrics to monitor and track a user's O&M training progress and to compare the user's progress against other O&M training participants. Overall, the vision-assist systems described herein may improve and allow environmental and social interactions that are currently difficult or not generally possible for blind and visually impaired individuals while encouraging the visually-impaired user to gain confidence in his or her own abilities.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vision-assist system comprising:
   one or more processors;
   a memory module communicatively coupled to the one or more processors;
   an environmental sensing device communicatively coupled to the one or more processors and operable to generate information regarding an environment;
   a feedback device communicatively coupled to the one or more processors and operable to generate feedback at least partially based on the generated environmental information of the environmental sensing device; and
   machine readable instructions stored in the memory module that cause the vision-assist system to perform at least the following when executed by the one or more processors:
      record a first metric corresponding to a level of reliance by a user on the feedback device at a first time, wherein the level of reliance is based at least in part on a measurable dependence on the generated feedback, and wherein the level of reliance is at least partially based on at least one of:
         a Braille assist feature associated with the environmental sensing device and the memory module,
         an object identification assist feature associated with the environmental sensing device and the memory module to assist the user in identifying an object, and
         a facial recognition assist feature to assist the user in facial recognition;
      record a second metric corresponding to the level of reliance by the user on the feedback device at a second time, wherein the second time occurs after the first time; and
      record an awarded amount of reliance points when the second metric is less than the first metric, indicative of a decrease on a reliance by the user on the vision-assist system, wherein the awarded amount of reliance points corresponds to a percentage by which the second metric decreases compared to the first metric.

2. The vision-assist system of claim 1, wherein when executed by the one or more processors, the machine readable instructions cause the vision-assist system to:
   receive environmental image data from the environmental sensing device;
   provide at least a portion of the generated feedback with the feedback device of at least one of:
      one or more definitions of Braille text viewable to the environmental sensing device upon user initiated request, and
      indications of user error when the user reads the Braille text at least one of automatically and upon user initiated request.

3. The vision-assist system of claim 1, wherein when executed by the one or more processors, the machine readable instructions cause the vision-assist system to:
   receive environmental image data from the environmental sensing device;
   determine a location of an obstacle comprising the object within a predetermined range based on the environmental image data; and
   provide at least a portion of the generated feedback with the feedback device based on the location of the obstacle.

4. The vision-assist system of claim 3, wherein when executed by the one or more processors, the machine readable instructions cause the vision-assist system to:
   detect when a cane utilized by the user and contacts the obstacle;
   provide at least a portion of the generated feedback with the feedback device when the cane utilized by the user contacts the obstacle; and
   award one or more user training progression points based on at least one of time to contact the obstacle with the cane and an amount of user initiated requests for feedback regarding the location of the obstacle.

5. The vision-assist system of claim 1, wherein when executed by the one or more processors, the machine readable instructions cause the vision-assist system to:
   receive environmental image data from the environmental sensing device;
   determine an identification of the object within a predetermined range based on the environment image data by recognizing the object in the received environmental image data using an object recognition algorithm; and
   provide at least a portion of the generated feedback with the feedback device based on the determined identification of the object.

6. The vision-assist system of claim 5, wherein when executed by the one or more processors, the machine readable instructions cause the vision-assist system to:
   prompt the user to provide user input regarding a guessed identification of the object; and
   award one or more points when the guessed identification of the object matches the determined identification of the object.

7. The vision-assist system of claim 1, wherein when executed by the one or more processors, the machine readable instructions cause the vision-assist system to:
   receive environmental image data from the environmental sensing device;

determine an identity of a person based on the environmental image data by recognizing a face in the received environmental image data using a facial recognition algorithm; and provide at least a portion of the generated feedback with the feedback device based on the determined identity of the person at least one of automatically or upon user initiated request.

8. The vision-assist system of claim 7, wherein when executed by the one or more processors, the machine readable instructions cause the vision-assist system to:

prompt the user to provide user input regarding a guessed identity of the person prior to providing at least a portion of the generated feedback with the feedback device based on the determined identity of the person; and award one or more points when the guessed identity of the person matches the determined identity of the person.

9. The vision-assist system of claim 1, wherein when executed by the one or more processors, the machine readable instructions cause the vision-assist system to:

store the awarded amount of reliance points in a cloud database system communicatively coupled to the one or more processors; and provide one or more reports based on at least one of the awarded amount of reliance points and one or more other user training progression tracking metrics based on user interaction with the vision-assist system.

10. A method for awarding points based on reliance on a vision-assist system comprising a global positioning system sensor and a memory module, each communicatively coupled to one or more processors of the vision-assist system, the method comprising:

recording a first metric corresponding to a level of reliance on a feedback device by a user on the vision-assist system at a first time, wherein:

an environmental sensing device comprising at least one of an environment camera and one or more microphones is communicatively coupled to the one or more processors and is operable to generate information regarding an environment, the feedback device is communicatively coupled to one or more processors of the vision-assist system and is operable to generate feedback at least partially based on the generated environmental information of the environmental sensing device, and the level of reliance on the feedback device by the user is at least partially based on at least one of:

a navigation feature utilizing data from the global positioning system sensor and associated with the environmental sensing device, a Braille assist feature associated with the environmental sensing device and the memory module, an object identification assist feature associated with the environmental sensing device and the memory module, and a facial recognition feature associated with the environmental sensing device and the memory module;

recording a second metric corresponding to the level of reliance on the feedback device by the user on the vision-assist system at a second time, wherein the second time occurs after the first time;

awarding an amount of reliance points when the second metric is less than the first metric, indicative of a decrease on a reliance by the user on the vision-assist system, wherein the amount of reliance points corresponds to a percentage by which the second metric decreases compared to the first metric; and storing in a cloud database system communicatively coupled to the one or more processors at least one of the amount of reliance points and one or more other user training progression tracking metrics based on user interaction with the vision-assist system.

11. A vision-assist system comprising:

one or more processors;

a global positioning system sensor communicatively coupled to the one or more processors;

a memory module communicatively coupled to the one or more processors;

an environmental sensing device communicatively coupled to the one or more processors and operable to generate information regarding an environment;

a feedback device communicatively coupled to the one or more processors and operable to generate feedback at least partially based on the generated environmental information of the environmental sensing device; and machine readable instructions stored in the memory module that cause the vision-assist system to perform at least the following when executed by the one or more processors:

record a first metric corresponding to a level of reliance by a user on the feedback device at a first time, wherein the level of reliance is based at least in part on a measurable dependence on the generated feedback, the level of reliance is at least partially based on a navigation feature utilizing data from the global positioning system sensor, and the navigation feature determines at least one or more navigational directions providable to the user;

record a second metric corresponding to the level of reliance by the user on the feedback device at a second time, wherein the second time occurs after the first time; and record an awarded amount of reliance points when the second metric is less than the first metric, indicative of a decrease on a reliance by the user on the vision-assist system, wherein the awarded amount of reliance points corresponds to a percentage by which the second metric decreases compared to the first metric.

12. The vision-assist system of claim 11, wherein when executed by the one or more processors, the machine readable instructions cause the vision-assist system to:

determine a route based on the data from the global positioning system sensor;

receive environmental image data from the environmental sensing device; and provide at least a portion of the generated feedback with the feedback device of the one or more navigational directions at pre-determined points along the route to the user based on the received environmental image data and the data from the global positioning system sensor.

13. The vision-assist system of claim 12, wherein the provided feedback is based on a user initiated feedback request.

14. The vision-assist system of claim 12, wherein an amount of feedback provided by the feedback device decreases over a period of use such that an amount of the one or more navigation directions provided in an earlier use of the vision-assist system is greater than the amount of the one or more navigation directions provided in a later use of the vision-assist system use after the earlier use.

15. The vision-assist system of claim 14, wherein the decrease in the amount of feedback provided is controlled via user input.

16. The vision-assist system of claim 14, wherein the decrease in the amount of feedback provided is automatically controlled by a feedback reduction algorithm that reduces the amount of feedback based on a pre-determined amount over one or more pre-determined time period intervals.

\* \* \* \* \*